(12) United States Patent
Turner et al.

(10) Patent No.: US 10,486,069 B2
(45) Date of Patent: *Nov. 26, 2019

(54) RANKING OF USER-GENERATED GAME PLAY ADVICE

(71) Applicants: SONY INTERACTIVE ENTERTAINMENT AMERICA LLC, San Mateo, CA (US); Sony Computer Entertainment Europe Ltd., London (GB)

(72) Inventors: Sean Turner, London (GB); Phil Harrison, London (GB)

(73) Assignees: Sony Interactive Entertainment America LLC, San Mateo, CA (US); Sony Computer Entertainment Europe LTD., London (GB)

( * ) Notice: Subject to any disclaimer, the term of this patent is extended or adjusted under 35 U.S.C. 154(b) by 638 days.

This patent is subject to a terminal disclaimer.

(21) Appl. No.: 14/848,183

(22) Filed: Sep. 8, 2015

(65) Prior Publication Data

US 2016/0018934 A1 Jan. 21, 2016

Related U.S. Application Data

(63) Continuation of application No. 11/850,516, filed on Sep. 5, 2007, now Pat. No. 9,126,116.

(51) Int. Cl.
*A63F 13/5375* (2014.01)
*G06F 3/048* (2013.01)
(Continued)

(52) U.S. Cl.
CPC .......... *A63F 13/5375* (2014.09); *A63F 13/12* (2013.01); *A63F 13/30* (2014.09);
(Continued)

(58) Field of Classification Search
CPC ...... A63F 13/5375; A63F 13/30; A63F 13/54; A63F 13/798; A63F 13/80; A63F 13/12;
(Continued)

(56) References Cited

U.S. PATENT DOCUMENTS

| 3,147,341 A | 9/1964 | Gibson et al. |
| 3,200,193 A | 8/1965 | Biggs et al. |

(Continued)

FOREIGN PATENT DOCUMENTS

| CN | 1201180 A | 12/1998 |
| CN | 18385783 | 12/2002 |

(Continued)

OTHER PUBLICATIONS

Ricadela, A. (1998). Texts share tips for enhancing play in popular PC and console titles—books present natural add-on sales for games. Computer Retail Week, 8(223), 39. Retrieved from https://dialog.proquest.com/professional/docview/667110627?accountid=142257 (Year: 1998).*

(Continued)

*Primary Examiner* — Amanda C Abrahamson
(74) *Attorney, Agent, or Firm* — Carr & Ferrell LLP

(57) ABSTRACT

Management of user-generated game play advice is disclosed. The present invention allows for management of game play advice that is complete and up-to-date regardless of when a particular interactive gaming title is released. Game play advice is pervasive and easily accessible to game players in addition to being accurate and credible such that game players can trust or rely upon the rendered advice.

25 Claims, 6 Drawing Sheets

(51) Int. Cl.
  *G06Q 50/00*      (2012.01)
  *A63F 13/30*      (2014.01)
  *A63F 13/54*      (2014.01)
  *A63F 13/798*     (2014.01)
  *A63F 13/80*      (2014.01)

(52) U.S. Cl.
  CPC ............ *A63F 13/54* (2014.09); *A63F 13/798*
      (2014.09); *A63F 13/80* (2014.09); *G06F 3/048*
      (2013.01); *G06Q 50/01* (2013.01); *A63F*
      *2300/305* (2013.01); *A63F 2300/558*
      (2013.01); *A63F 2300/572* (2013.01)

(58) Field of Classification Search
  CPC .......... A63F 2300/305; A63F 2300/558; A63F
      2300/572; G06F 3/048; G06Q 50/01
  See application file for complete search history.

(56) References Cited

U.S. PATENT DOCUMENTS

| | | | |
|---|---|---|---|
| 4,016,540 A | 4/1977 | Hyatt | |
| 4,090,216 A | 5/1978 | Constable | |
| 4,104,625 A | 8/1978 | Bristow et al. | |
| 4,355,334 A | 10/1982 | Fitzgibbon et al. | |
| 4,445,187 A | 4/1984 | Best | |
| 4,475,132 A | 10/1984 | Rodesch | |
| 4,514,727 A | 4/1985 | Van Antwerp | |
| 4,569,026 A | 2/1986 | Best | |
| 4,677,569 A | 6/1987 | Nakano et al. | |
| 4,704,696 A | 11/1987 | Reimer et al. | |
| 4,752,069 A | 6/1988 | Okada | |
| 4,757,525 A | 7/1988 | Matthews et al. | |
| 4,952,917 A | 8/1990 | Yabuuchi | |
| 5,057,744 A | 10/1991 | Barbier et al. | |
| 5,167,010 A | 11/1992 | Elm et al. | |
| 5,241,671 A | 8/1993 | Reed et al. | |
| 5,274,560 A | 12/1993 | LaRue | |
| 5,321,833 A | 6/1994 | Chang et al. | |
| 5,358,259 A | 10/1994 | Best | |
| 5,377,997 A | 1/1995 | Wilden et al. | |
| 5,405,152 A | 4/1995 | Katanics et al. | |
| 5,446,714 A | 8/1995 | Yoshio et al. | |
| 5,498,002 A | 3/1996 | Gechter | |
| RE35,314 E | 8/1996 | Logg | |
| 5,598,297 A | 1/1997 | Yamanaka et al. | |
| 5,617,407 A | 4/1997 | Bareis | |
| 5,649,861 A | 7/1997 | Okano et al. | |
| 5,659,732 A | 8/1997 | Kirsch | |
| 5,704,837 A | 1/1998 | Iwasaki et al. | |
| 5,724,567 A | 3/1998 | Rose et al. | |
| 5,732,232 A | 3/1998 | Brush, II et al. | |
| 5,765,150 A | 6/1998 | Burrows | |
| 5,786,801 A | 7/1998 | Ichise | |
| 5,802,361 A | 9/1998 | Wang et al. | |
| 5,818,553 A | 10/1998 | Koenck et al. | |
| 5,823,879 A | 10/1998 | Goldberg et al. | |
| 5,870,740 A | 2/1999 | Rose et al. | |
| 5,890,122 A | 3/1999 | Van Kleeck et al. | |
| 5,947,823 A | 9/1999 | Nimura | |
| 5,948,040 A | 9/1999 | DeLorme et al. | |
| 5,974,412 A | 10/1999 | Hazlehurst et al. | |
| 5,977,968 A | 11/1999 | Le Blanc | |
| 6,001,013 A | 12/1999 | Ota | |
| 6,012,053 A | 1/2000 | Pant et al. | |
| 6,017,272 A | 1/2000 | Rieder | |
| 6,064,978 A * | 5/2000 | Gardner | G06Q 30/02 |
| | | | 434/322 |
| 6,067,539 A | 5/2000 | Cohen | |
| 6,098,061 A | 8/2000 | Gotoh et al. | |
| 6,155,924 A | 12/2000 | Nakagawa et al. | |
| 6,168,524 B1 | 1/2001 | Aoki et al. | |
| 6,183,366 B1 | 2/2001 | Goldberg et al. | |
| 6,202,058 B1 | 3/2001 | Rose et al. | |
| 6,210,273 B1 | 4/2001 | Matsuno | |
| 6,241,524 B1 * | 6/2001 | Aoshima | A63F 13/10 |
| | | | 434/118 |
| 6,264,560 B1 | 7/2001 | Goldberg et al. | |
| 6,273,818 B1 | 8/2001 | Komoto | |
| 6,283,861 B1 | 9/2001 | Kawai et al. | |
| 6,296,570 B1 | 10/2001 | Miyamoto et al. | |
| 6,319,121 B1 | 11/2001 | Yamada et al. | |
| 6,327,590 B1 | 12/2001 | Chidlovskii et al. | |
| 6,363,378 B1 | 3/2002 | Conklin et al. | |
| 6,366,272 B1 | 4/2002 | Rosenberg et al. | |
| 6,375,571 B1 | 4/2002 | Ohnuma et al. | |
| 6,409,604 B1 | 6/2002 | Matsuno | |
| 6,413,163 B1 | 7/2002 | Yamauchi et al. | |
| 6,419,580 B1 | 7/2002 | Ito | |
| 6,428,411 B1 | 8/2002 | Togami | |
| 6,434,556 B1 | 8/2002 | Levin et al. | |
| 6,456,977 B1 | 9/2002 | Wang | |
| 6,508,706 B2 | 1/2003 | Sitrick et al. | |
| 6,529,875 B1 | 3/2003 | Nakajima et al. | |
| 6,533,663 B1 | 3/2003 | Iwao et al. | |
| 6,538,666 B1 | 3/2003 | Ozawa et al. | |
| 6,554,707 B1 | 4/2003 | Sinclair et al. | |
| 6,556,983 B1 | 4/2003 | Altschuler et al. | |
| 6,571,208 B1 | 5/2003 | Kuhn et al. | |
| 6,572,478 B2 | 6/2003 | Miyamoto et al. | |
| 6,582,230 B1 | 6/2003 | Aoshima et al. | |
| 6,582,309 B2 | 6/2003 | Higurashi et al. | |
| 6,585,599 B1 | 7/2003 | Horigami et al. | |
| 6,652,384 B2 | 11/2003 | Kondo et al. | |
| 6,684,127 B2 | 1/2004 | Fujita et al. | |
| 6,705,945 B2 | 3/2004 | Gavin et al. | |
| 6,729,954 B2 | 5/2004 | Atsumi et al. | |
| 6,826,552 B1 * | 11/2004 | Grosser | G06Q 30/02 |
| | | | 706/47 |
| 6,899,628 B2 | 5/2005 | Leen et al. | |
| 6,920,426 B2 | 7/2005 | Takechi | |
| 6,928,433 B2 | 8/2005 | Goodman et al. | |
| 6,935,954 B2 | 8/2005 | Sterchi et al. | |
| 6,966,832 B2 | 11/2005 | Leen et al. | |
| 6,979,267 B2 | 12/2005 | Leen et al. | |
| 7,029,394 B2 | 4/2006 | Leen et al. | |
| 7,062,561 B1 | 6/2006 | Reisman | |
| 7,085,722 B2 | 8/2006 | Luisi | |
| 7,137,891 B2 | 11/2006 | Neveu et al. | |
| 7,155,157 B2 | 12/2006 | Kaplan | |
| 7,172,118 B2 | 2/2007 | Urken | |
| 7,180,529 B2 | 2/2007 | Covannon et al. | |
| 7,202,613 B2 | 4/2007 | Morgan et al. | |
| 7,233,904 B2 | 6/2007 | Luisi | |
| 7,438,642 B2 | 10/2008 | Walker et al. | |
| 7,452,273 B2 | 11/2008 | Amaitis et al. | |
| 7,455,589 B2 | 11/2008 | Neveu et al. | |
| 7,572,187 B2 | 8/2009 | Van Luchene | |
| 7,613,616 B2 | 11/2009 | Luisi | |
| 7,717,782 B2 | 5/2010 | Van Luchene | |
| 7,731,589 B2 | 6/2010 | Kataoka et al. | |
| 7,764,026 B2 | 7/2010 | Dowling et al. | |
| 7,880,746 B2 | 2/2011 | Marks et al. | |
| 7,946,909 B2 | 5/2011 | Neveu et al. | |
| 7,965,859 B2 | 6/2011 | Marks | |
| 8,295,549 B2 | 10/2012 | Marks et al. | |
| 8,442,403 B2 | 5/2013 | Weaver | |
| 8,714,983 B2 | 5/2014 | Kil | |
| 8,799,250 B1 * | 8/2014 | Smith | G06Q 30/02 |
| | | | 707/705 |
| 8,964,298 B2 | 2/2015 | Haddick et al. | |
| 9,108,108 B2 | 8/2015 | Zalewski et al. | |
| 9,126,116 B2 | 9/2015 | Turner et al. | |
| 9,155,960 B2 | 10/2015 | Argiro | |
| 9,833,707 B2 | 12/2017 | Watson | |
| 9,950,259 B2 | 4/2018 | Watson | |
| 10,128,914 B2 | 11/2018 | Calabrese | |
| 2001/0009867 A1 | 7/2001 | Sakaguchi et al. | |
| 2002/0068626 A1 | 6/2002 | Takeda et al. | |
| 2002/0082065 A1 | 6/2002 | Fogel et al. | |
| 2002/0103031 A1 | 8/2002 | Neveu et al. | |
| 2002/0169617 A1 | 11/2002 | Luisi | |
| 2003/0065636 A1 * | 4/2003 | Peyrelevade | A45D 44/005 |
| | | | 706/62 |

(56) References Cited

U.S. PATENT DOCUMENTS

| | | |
|---|---|---|
| 2003/0109305 A1 | 6/2003 | Gavin et al. |
| 2003/0177347 A1* | 9/2003 | Schneier ............... A63F 13/12 713/151 |
| 2004/0029625 A1 | 2/2004 | Annunziata |
| 2004/0166935 A1 | 8/2004 | Gavin et al. |
| 2005/0054290 A1 | 3/2005 | Logan et al. |
| 2005/0170828 A1 | 8/2005 | Nakamura et al. |
| 2005/0174889 A1 | 8/2005 | Marcantonio et al. |
| 2005/0191969 A1 | 9/2005 | Mousseau |
| 2005/0275508 A1 | 12/2005 | Orr et al. |
| 2006/0039017 A1 | 2/2006 | Park et al. |
| 2006/0178179 A1 | 8/2006 | Neveu et al. |
| 2006/0190270 A1 | 8/2006 | Luisi |
| 2007/0037605 A1 | 2/2007 | Logan |
| 2007/0060231 A1 | 3/2007 | Neveu et al. |
| 2007/0087797 A1 | 4/2007 | Van Luchene |
| 2007/0099709 A1 | 5/2007 | Okada |
| 2007/0244704 A1 | 10/2007 | Luisi |
| 2007/0257928 A1 | 11/2007 | Marks et al. |
| 2007/0279427 A1 | 12/2007 | Marks |
| 2008/0064019 A1 | 3/2008 | Kaufman et al. |
| 2008/0109491 A1 | 5/2008 | Gupta |
| 2008/0167106 A1 | 7/2008 | Lutnick et al. |
| 2008/0220869 A1* | 9/2008 | Midgley ............... A63F 13/12 463/40 |
| 2009/0054814 A1 | 2/2009 | Schnapp et al. |
| 2009/0063463 A1 | 3/2009 | Turner et al. |
| 2009/0119234 A1* | 5/2009 | Pinckney ............... G06N 20/00 706/12 |
| 2010/0041475 A1 | 2/2010 | Zalewski et al. |
| 2010/0111374 A1 | 5/2010 | Stoica |
| 2010/0138764 A1 | 6/2010 | Hatambeiki et al. |
| 2010/0171430 A1 | 7/2010 | Seydoux |
| 2010/0213873 A1 | 8/2010 | Picard et al. |
| 2010/0241496 A1 | 9/2010 | Gupta et al. |
| 2010/0312366 A1 | 12/2010 | Madonna et al. |
| 2013/0344960 A1 | 12/2013 | Perry et al. |
| 2014/0121009 A1 | 5/2014 | Watson |
| 2014/0132628 A1 | 5/2014 | Hoff |
| 2014/0135631 A1 | 5/2014 | Brumback et al. |
| 2014/0142403 A1 | 5/2014 | Brumback et al. |
| 2014/0191848 A1 | 7/2014 | Imes et al. |
| 2014/0329613 A1 | 11/2014 | Savarese et al. |
| 2014/0361872 A1 | 12/2014 | Garcia et al. |
| 2015/0141005 A1 | 5/2015 | Suryavanshi et al. |
| 2015/0304804 A1 | 10/2015 | Lotito |
| 2015/0347738 A1 | 12/2015 | Ulrich et al. |
| 2016/0057565 A1 | 2/2016 | Gold |
| 2016/0282899 A1 | 9/2016 | Inagaki et al. |
| 2017/0368459 A1 | 12/2017 | Watson |
| 2018/0091193 A1 | 3/2018 | Hagedorn |
| 2018/0326304 A1 | 11/2018 | Daniel |
| 2019/0074868 A1 | 3/2019 | Calabrese |

FOREIGN PATENT DOCUMENTS

| | | |
|---|---|---|
| CN | 1848742 A | 10/2006 |
| CN | 101836362 A | 9/2010 |
| CN | 101849436 A | 9/2010 |
| CN | 101968827 A | 2/2011 |
| CN | 101968827 B | 5/2014 |
| CN | 104797311 A | 7/2015 |
| CN | 104797311 B | 9/2018 |
| CN | 109107149 A | 1/2019 |
| DE | 19905076 A1 | 6/2002 |
| DE | 1262955 B | 3/2010 |
| EP | 789296 A1 | 8/1997 |
| EP | 0850673 A1 | 7/1998 |
| EP | 0898237 A2 | 2/1999 |
| EP | 0901803 A1 | 3/1999 |
| EP | 0913175 A2 | 5/1999 |
| EP | 1029569 A2 | 8/2000 |
| EP | 1078661 A1 | 2/2001 |
| EP | 1262955 A2 | 12/2002 |
| EP | 1355707 A2 | 10/2003 |
| EP | 1388357 A2 | 2/2004 |
| EP | 1434627 A1 | 7/2004 |
| EP | 1630754 A1 | 3/2006 |
| EP | 1650706 A2 | 4/2006 |
| EP | 1793588 A1 | 6/2007 |
| EP | 1262955 B1 | 3/2010 |
| EP | 2322257 A2 | 5/2011 |
| EP | 2322257 B1 | 4/2018 |
| FR | 1262955 A | 3/2010 |
| GB | 2355627 A | 9/1998 |
| GB | 2351637 A | 1/2001 |
| GB | 2356785 A | 5/2001 |
| GB | 2411065 A | 8/2005 |
| GB | 1262955 | 3/2010 |
| JP | S59202779 | 11/1984 |
| JP | H07178246 | 7/1995 |
| JP | H08155140 | 6/1996 |
| JP | H09265379 | 10/1997 |
| JP | H10272258 | 10/1998 |
| JP | H10295935 | 11/1998 |
| JP | H11000467 | 1/1999 |
| JP | H11070273 | 3/1999 |
| JP | H11119791 | 4/1999 |
| JP | H11197359 | 7/1999 |
| JP | 2000024322 A | 1/2000 |
| JP | 2000116946 A | 4/2000 |
| JP | 2000176154 A | 6/2000 |
| JP | 2000334168 A | 12/2000 |
| JP | 2001009156 A | 1/2001 |
| JP | 2001029649 A | 2/2001 |
| JP | 2001079265 A | 3/2001 |
| JP | 2001157779 A | 6/2001 |
| JP | 2001198350 A | 7/2001 |
| JP | 2002052256 A | 2/2002 |
| JP | 2002085835 A | 3/2002 |
| JP | 2002092474 A | 3/2002 |
| JP | 2002159740 A | 6/2002 |
| JP | 2002166048 A | 6/2002 |
| JP | 2002191868 A | 7/2002 |
| JP | 2003047768 A | 2/2003 |
| JP | 2003228585 A | 8/2003 |
| JP | 2004529678 A | 9/2004 |
| JP | 2005505357 A | 2/2005 |
| JP | 3741687 B2 | 11/2005 |
| JP | 2006031670 A | 2/2006 |
| JP | 2006087459 A | 4/2006 |
| JP | 2006099125 A | 4/2006 |
| JP | 3865721 B2 | 10/2006 |
| JP | 2007249899 A | 9/2007 |
| JP | 2011025044 A | 2/2011 |
| JP | 5580131 B2 | 7/2014 |
| KR | 1020000052753 | 12/2000 |
| KR | 0464877 | 12/2004 |
| KR | 100469822 B1 | 1/2005 |
| KR | 1020020044919 | 6/2005 |
| KR | 1020070052493 | 9/2008 |
| KR | 101226305 B1 | 1/2013 |
| WO | WO1994018790 | 8/1994 |
| WO | WO9714102 A1 | 4/1997 |
| WO | WO2001082626 | 11/2001 |
| WO | WO2002060548 | 8/2002 |
| WO | WO2003031003 | 4/2003 |
| WO | WO2005040900 A1 | 5/2005 |
| WO | WO2006033360 A1 | 3/2006 |
| WO | WO2007130641 A2 | 11/2007 |
| WO | WO2009052659 A1 | 4/2009 |
| WO | WO2009060376 A1 | 5/2009 |
| WO | WO2014070677 A2 | 5/2014 |
| WO | WO2019050692 A1 | 3/2019 |

OTHER PUBLICATIONS

Screen Shot of a Role Playing Game; Available at http://images.fok.nl/upload/lotrrotk2.jpg (accessed Oct. 11, 2005).

Screen Shot of a Role Playing Game; Available at http://images.fok.nl/upload/lotrrotk3.jpg (accessed Oct. 11, 2005).

(56) References Cited

OTHER PUBLICATIONS

Arcadia, vol. 2, No. 12, Enterbrain, Inc., Dec. 1, 2001, pp. 56-63.
Konami Corporation, Konami Official Guide Perfect Series, Tokimeki Memorial—Forever with You: Official Guide, First Edition, , Jun. 29, 1997.
Login, vol. 21, No. 4, Enterbrain, Inc. Apr. 1, 2002, pp. 70-77.
Reynolds, Craig, "Flocks, Herds, and Schools: A Distributed Behavioral Model," Proceedings of SIGGRAPH '87, Computer Graphics 21(4), Jul. 1987.
Reynolds, Craig, "Interaction with Groups of Autonomous Characters," Proceedings of Game Developer Conference 2000, San Francisco, CA 2000.
Reynolds, Craig, "Steering Behaviors for Autonomous Characters," Proceedings of Game Developers Conference 1999.
Super Mario Brothers: Complete Cheat Book, Tokuma Publishing Co., Ltd., Nov. 20, 1985, p. 9.
Yu, Bin et al., "A Social Mechanism of Reputation Management in Electronic Communities," Proceedings of 4th International Workshop on Cooperative Information Agents, 2000.
Aguilera, S. et al., "Impaired Persons Facilities Based on a Multi-Modality Speech Processing System," Proc. On Speech & Language Tech., 1993.
Arons, B., "Authoring and Transcription Tools for Speech-Based Hypermedia," Proc. Of American Voice I/O Society, 1991.
Arons, B., "Hyperspeech: Navigating in Speech-Only Hypermedia," Proc. Of Hypertext, 1991.
Bennacef, S.K., A Spoken Language System for Information Retrieval Proc. Of ICSLP, 1994.
Gauvain, J.L. et al., "Speech Recognition for an Information Kiosk," Proc. Of ICSLP, 1996.
Gauvain, J.L. et al., "Spoken Language Component of the MASK Kiosk," Human Comfort and Security fo Information Systems, 1995.
Gauvain, J.L. et al., "The LIMSI Continuous Speech Dictation System," Proc. ARPA Human Lang. & Technology, 1994.
Gauvain, J.L. et al., "The LIMSI Continuous Speech Dictation System: Evaluation on the ARPA Wall Street Journal Task," Proc. Of the IEEE-ICASSP, 1994.
Goddeau, D. et al., "Galaxy: A Human-Language Interface to On-Line Travel Information," Proc. Of ICSLP, 1994.
House, D., "Spoken-Language Access to Multimedia (SLAM): Masters Thesis," Oregon Graduate Inst., Dept. Of CS and Eng., 1995.
Mostow, Jack et al., "Towards a Reading coach That Listens: Automated Detection of Oral Reading Errors", Proc. Of the 11th Ntl. Conf. on A.I., 1993.
Russell, M. et al., "Applications of Automatic Speech Recognition to Speech and Language Development in Young Children," Proc. Of ICSLP, 1996.
Lamel, L.F. et al., "Recent Developments in Spoken Language Systems for Information Retrieval," ESCA ETRW Spoken Dialog Systems, 1995.
Language Industry Monitor, "Janet Baker's Optimism," 1992.
Internet.com, "Graphical User Interface," available at http://www.webopedia.com; accessed Sep. 24, 2004. Last Modified May 17, 2004.
Screen Shot of a Civilization Building Game; Available at http://www.s2.com.br/s2arquivos/361/Imagens/2323Image.jpg (accessed Oct. 11, 2005).
Dorsey et al., Design and Simulation of Opera Lighting and Projection Effects, Program of Computer Graphics, Computer Graphics, Jul. 1991, vol. 25, No. 4, New York.
Calvert, Justin, SCEE's latest plans for its Eye Toy peripheral will effectively turn the PlayStation 2 into a videophone. First screens inside, SCEE announces Eye Toy; Chat, Game spot, http://www.gamespot.com/news/6095429.html, May 5, 2004.
Screen Shot of a Civilization Building Game; Available at http://www.s2.com.br/s2arquivos/361/Imagens/2324Image.jpg (accessed Oct. 11, 2005).
Screen Shot of a Flight Simulator; Available at http://foto.spullenbank.nl/common/img/00/00/03/31/_T33178.jpg (accessed Oct. 11, 2005.
Nayer et al., Lighting Sensitivity Display, ACM Transactions on Graphics, Oct. 2004, vol. 23, No. 4, pp. 963-979, New York.
Spagnoletti, Philips Ambilight TV, Home Entertainment, engadget, Jul. 8, 2004.
Screen Shot of a Flight Simulator; Available at http://orbit.madphys.ucl.ac.uk/images/gallery 64.jpg (accessed Oct. 11, 2005).
Wikipedia Article on Diablo II, http://en.wikipedia.org/wiki/Diablo_II.
Diablo II Frost nova Description, http://diablo2.diablowiki.net/Frost_Nova.
Diefendorff, "Sony's Emotionally Charged Chip", Microprocessor Report, vol. 13, No. 5, Apr. 19, 1999.
Communication from the Examining Division for EP 02009339 dated Dec. 11, 2006.
Communication from the Examining Division for EP 02009339 dated Jul. 4, 2007.
Communication from the Examining Division for EP 02009339 dated Sep. 17, 2008.
Sony Computer Entertainment, Inc., "Fantavision Game Manual", 2000.
Wikipedia, "Aimbot", http://en.wikipedia.org/wiki/Aimbot (last updated Jun. 3, 2005; last accessed Jul. 5, 2005).
Agarwal et al., "Ranking database Queries Using User Feedback: A Neural network Approach", CS511 Project, Advanced Database Management Systems, Fall 2006.
Agichtein et al., "Improving Web Search Ranking by Incorporating User Behavior Information", SIGIR 2006, Aug. 6-11, ACM.
Bhattacharjee et al., "Incentive Based ranking Mechanisms", Position Paper, Department of Computer Science, Stanford University, 2006.
Chaudhuri et al., "Probabilistic Information Retrieval Approach for Ranking of Databased Query Results," 2006.
Chidlovskii et al., "Collaborative Re-Ranking of Search Results", Xerox Research Centre Europe, AAAI—2000, Workshop on AI for Web Search, 2001.
Kang et al., Establishing Value Mappings Using Statistical Models and User Feedback, CIKM '05, Oct. 31-Nov. 5, 2005, 2005, ACM.
W3C Working Draft Jun. 18, 2007, The XMLHttpRequest Object, W3C, http://www.w3.org/TR/2007/WD-XMLHttpRequest-20070618/.
European Search Report dated Jan. 19, 2004 in EP Application No. EP02009339.
Communication from the Examining Division for EP 02009339 dated Jan. 19, 2006.
Non-Final Office Action, dated Dec. 17, 2003, U.S. Appl. No. 09/859,034, filed May 14, 2001.
Final Office Action, dated Jun. 4, 2004, U.S. Appl. No. 09/859,034, filed May 14, 2001.
Advisory Action, dated Aug. 25, 2004, U.S. Appl. No. 09/859,034, filed May 14, 2001.
Non-Final Office Action, dated Jan. 19, 2005, U.S. Appl. No. 09/859,034, filed May 14, 2001.
Final Office Action, dated Jun. 24, 2005, U.S. Appl. No. 09/859,034, filed May 14, 2001.
Advisory Action, dated Sep. 2, 2005, U.S. Appl. No. 09/859,034, filed May 14, 2001.
Notice of Allowance, dated Jan. 13, 2006, U.S. Appl. No. 09/859,034, filed May 14, 2001.
Non-Final Office Action, dated Nov. 17, 2005, U.S. Appl. No. 10/364,951, filed Feb. 11, 2003.
Final Office Action, dated May 16, 2006, U.S. Appl. No. 10/364,951, filed Feb. 11, 2003.
Advisory Action, dated Aug. 18, 2006, U.S. Appl. No. 10/364,951, filed Feb. 11, 2003.
Non-Final Office Action, dated Feb. 5, 2007, U.S. Appl. No. 10/364,951, filed Feb. 11, 2003.
Non-Final Office Action, dated Jul. 9, 2003, U.S. Appl. No. 10/268,278, filed Oct. 9, 2002.
Notice of Allowance, dated Dec. 2, 2003, U.S. Appl. No. 10/268,278, filed Oct. 9, 2002.
Non-Final Office Action, dated Dec. 30, 2004, U.S. Appl. No. 10/791,476, filed Mar. 1, 2004.

(56) References Cited

OTHER PUBLICATIONS

Non-Final Office Action, dated Apr. 5, 2006, U.S. Appl. No. 10/791,476, filed Mar. 1, 2004.
Final Office Action, dated Oct. 24, 2006, U.S. Appl. No. 10/791,476, filed Mar. 1, 2004.
Notice of Allowance, dated Feb. 16, 2007, U.S. Appl. No. 11/403,716, filed Apr. 13, 2006.
Non-Final Office Action, dated Feb. 25, 2003, U.S. Appl. No. 09/773,452, filed Jan. 31, 2001.
Non-Final Office Action, dated Jun. 5, 2003, U.S. Appl. No. 09/773,452, filed Jan. 31, 2001.
Final Office Action, dated Jun. 1, 2004, U.S. Appl. No. 09/773,452, filed Jan. 31, 2001.
Final Office Action, dated Sep. 24, 2004, U.S. Appl. No. 09/773,452, filed Jan. 31, 2001.
Advisory Action, dated May 4, 2005, U.S. Appl. No. 09/773,452, filed Jan. 31, 2001.
Non-Final Office Action, dated Sep. 13, 2005, U.S. Appl. No. 09/773,452, filed Jan. 31, 2001.
Final Office Action, dated Mar. 16, 2006, U.S. Appl. No. 09/773,452, filed Jan. 31, 2001.
Notice of Allowance, dated Jul. 11, 2006, U.S. Appl. No. 09/773,452, filed Jan. 31, 2001.
Non-Final Office Action, dated Jun. 2, 2008, U.S. Appl. No. 11/375,296, filed Mar. 13, 2006.
Notice of Allowance, dated Sep. 25, 2008, U.S. Appl. No. 11/375,296, filed Mar. 13, 2006.
Non-Final Office Action, dated Mar. 25, 2010, U.S. Appl. No. 11/624,886, filed Jan. 19, 2007.
Final Office Action, dated Aug. 24, 2010, U.S. Appl. No. 11/624,886, filed Jan. 19, 2007.
Notice of Allowance, dated Feb. 18, 2011, U.S. Appl. No. 11/624,886, filed Jan. 19, 2007.
Non-Final Office Action, dated May 2, 2008, U.S. Appl. No. 11/591,314, filed Oct. 31, 2006.
Non-Final Office Action, dated Aug. 2, 2010, U.S. Appl. No. 11/591,314, filed Oct. 31, 2006.
Notice of Allowance, dated Jan. 13, 2011, U.S. Appl. No. 11/591,314, filed Oct. 31, 2006.
Notice of Allowance, dated Sep. 18, 2009, U.S. Appl. No. 11/764,795, filed Jun. 18, 2007.
Non-Final Office Action, dated Apr. 1, 2011, U.S. Appl. No. 11/850,516, filed Sep. 5, 2007.
Final Office Action, dated Sep. 15, 2011, U.S. Appl. No. 11/850,516, filed Sep. 5, 2007.
Non-Final Office Action, dated Dec. 3, 2013, U.S. Appl. No. 11/850,516, filed Sep. 5, 2007.
Notice of Allowance, dated Jun. 19, 2014, U.S. Appl. No. 11/850,516, filed Sep. 5, 2007.
Non-Final Office Action, dated Aug. 11, 2014, U.S. Appl. No. 11/850,516, filed Sep. 5, 2007.
Notice of Allowance, dated Jan. 16, 2015, U.S. Appl. No. 11/850,516, filed Sep. 5, 2007.
Non-Final Office Action, dated Dec. 3, 2013, U.S. Appl. No. 12/509,848, filed Jul. 27, 2009.
Non-Final Office Action, dated May 29, 2014, U.S. Appl. No. 12/509,848, filed Jul. 27, 2009.
Non-Final Office Action, dated Sep. 19, 2014, U.S. Appl. No. 12/509,848, filed Jul. 27, 2009.
Final Office Action, dated Feb. 25, 2015, U.S. Appl. No. 12/509,848, filed Jul. 27, 2009.
Notice of Allowance, dated Jun. 19, 2015, U.S. Appl. No. 12/509,848, filed Jul. 27, 2009.
Non-Final Office Action, dated Sep. 12, 2016, U.S. Appl. No. 13/663,262, filed Oct. 29, 2012.
"Notice of Allowance", Chinese Patent Application No. 201380056819.3, dated Jun. 8, 2018, 2 pages [4 pages including translation].
"Notice of Allowance", European Patent Application No. 10007803.9, dated Oct. 23, 2017, 7 pages.
"Office Action", Chinese Patent Application No. 201380056819.3, dated Dec. 18, 2017, 3 pages [7 pages including translation].
"International Search Report" and "Written Opinion of the International Searching Authority," Patent Cooperation Treaty Application No. PCT/US2018/047694, dated Sep. 21, 2018, 12 pages.
Ohashi et al. "A Gesture Recognition Method for a Stick Input System ." Transactions of the Information Processing Society of Japan 40, No. 2 (1999) [retrieved on Mar. 19, 2014]. Retrieved from the Internet: <URL: http://ci.nii.ac.jp/naid/110002764810>. 12 pages.
"Office Action," Chinese Patent Application No. 201380056819.3, dated Jun. 23, 2017, 3 pages [7 pages including translation].
Communication from the Examining Division about intention to grant a European Patent for EP 02009339 dated Nov. 16, 2009.
Communication re: Decision to grant a European Patent for EP 02009339 dated Feb. 18, 2010.
International Search Report for PCT/US02/32438 dated Feb. 4, 2013.
International Search Report for PCT/US2007/010944 dated Feb. 18, 2008.
Rule 109/110 Communication from the Examining Division regarding possible amendment of claims for EP 02769043.7 dated May 25, 2004.
European Search Report dated Dec. 21, 2004 in EP Application No. EP02769043.7.
Communication from the Examining Division dated Apr. 28, 2005 in EP Application No. EP02769043.7.
Communication from the Examining Division regarding Summons to attend oral proceeding dated Oct. 24, 2006 in EP Application No. EP02769043.7.
Communication from the Examining Division regarding Decision to refuse a European patent application dated Jan. 31, 2007 in EP 027699043.7.
International Search Report for PCT/US02/02710 dated Sep. 12, 2002.
Rule 109/110 Communication from the Examining Division regarding possible amendment of claims for EP 02704295.1 dated Sep. 5, 2007.
Communication from the Examining Division dated Apr. 23, 2004 in EP Application No. 02704295.1.
Communication from the Examining Division dated Dec. 15, 2004 in EP Application No. 02704295.1.
Communication from the Examining Division re: Summons to attend oral proceedings dated Dec. 13, 2005 in EP Application No. 02704295.1.
Communication from the Examining Division re: Decision to refuse a European Patent application dated Apr. 12, 2006 in EP Application No. 02704295.1.
Rejection dated in CN application 201010245413.8 dated Sep. 7, 2012.
Rejection dated in CN application 201010245413.8 dated Apr. 1, 2013.
European Search Report for EP 10007803.9 dated Aug. 8, 2013.
Rejection dated Mar. 26, 2013 in JP Application No. 2010-167803.
Rejection dated Mar. 16, 2012 in KR Application No. 10-2010-0072613.
International Search Report & Written Opinion dated May 1, 2014 in Application No. PCT/US2013/067135 filed Oct. 28, 2013.
Rejection dated Mar. 2, 2004 in KR Application No. 10-2002-00265621.
Decision to Grant dated Oct. 5, 2005 in JP Application 2002-5607373.
Rejection dated Nov. 16, 2003 in JP Application 2002-5607373.
Rejection dated in CN application 201010245413.8 dated Nov. 5, 2013.
European Search Report for EP 03254168.2 dated Apr. 23, 2004.
1st Communication from the Examining Division in EP 03254168.2 dated Sep. 29, 2006.
Stern, Andrew. Virtual Babyz: Believeable agents with Narrative Intelligence, Narrative Intelligence AAAI Symposium, Nov. 1999. Online. Viewed Apr. 28, 2006. http://www.cs.cmu.edu/afs/cs/user/michaelm/www/nidocs/Stem.html.
"Babyz Features Page." Online. Viewed May 3, 2006. www.babyz.net/features.html.

(56) References Cited

OTHER PUBLICATIONS

"Babyz". Wikipedia online reference. Viewed May 1, 2006. http://en.wikipedia.or.q/wiki/babyz.

Northwestern University CS395, Game Design Course "Simulation and Modeling: Under the Hood of the Sims", Spring 2002. http://www.cs.northwestern.edu/%7Eforbus/c95-gd/lectures/The_Sims_Under_the_Hood_files/frame.htm.

Simpson, Dan. "The Complete Sims Guide" Feb. 6, 2005, pertinent sections printed from the Internet, may also be found in its entirety at http://www.neoseeker.com/resourcelink.html?rlid=16238&rid=15516.

"Sequence Paradium 2—Laughter in the Dark—Tactical Guidebook", First Edition, Keibunsha Inc., Feb. 10, 2005, pp. 5-32.

Sprigg, Sean M., Patent Examiner, Examiner's Affidavit, Nov. 9, 2005.

Stern, Andrew. "Andrew Stern". Online. Viewed Apr. 28, 2006. http://quvu.net/andrew/resume.html.

Stewart, Nick. "The Adrenaline Vault Review of The Sims", Mar. 9, 2000. Printed from the Internet.

"The Sims", Oct. 14, 2005, pertinent sections printed from the Internet, may also be found in its entirety at:http://pc.gamespy.com/pc/the-sims/.

Decision to Grant / Notice of Allowance dated Jun. 3, 2014 in JP 2010167803 filed Jul. 27, 2010.

Rejection dated Mar. 15, 2005 in JP 2003-288128 filed Aug. 6, 2003.

Rejection dated Dec. 13, 2005 in JP 2003-288128 filed Aug. 6, 2003.

Notice of Allowance dated Oct. 31, 2012 in KR 10-2010-0072613.

Examination Report dated Sep. 29, 2014 in EP Application No. 10007803.9 filed Jul. 27, 2010.

Rejection dated Nov. 15, 2016 in CN 201380056819.3 filed Oct. 28, 2013. 6 pages [16 pages including translation].

Ricadela, A. (1998). Texts share tips for enhancing play in popular PC and console titles—books present natural add-on sales for games. Computer Retail Week, 8(223), 39. Retrieved from https://dialog.proquest.conn/professional/docview/667110627?accountid=142257 (Year: 1998).

* cited by examiner

RANKING OF USER-GENERATED GAME PLAY ADVICE

CROSS-REFERENCE TO RELATED APPLICATIONS

The present application is a continuation of and claims priority benefit from U.S. patent application Ser. No. 11/850,516, filed Sep. 5, 2007 and entitled, "Ranking of User-Generated Game Play Advice," now U.S. Pat. No. 9,126,116 issued on Sep. 8, 2015, the disclosure of which is incorporated herein by reference in its entirety.

BACKGROUND OF THE INVENTION

Field of the Invention

The present invention generally relates to interactive game play and more specifically to the ranking of advice rendered to aid a user with interactive game play.

Description of the Related Art

Improvements in processing power and graphics quality have lead to increasingly complex interactive gaming environments. For example, the PlayStation®3's RSX graphics processor allows for freedom of graphics expression in creating next-generation, real-time 3D imagery. Working in tandem with Sony Computer Entertainment Inc.'s Cell Broadband Engine™ Architecture, RSX processor rendered graphics are unparalleled in quality and realism.

Increasingly complex gaming environments have, in turn, resulted in more complex story lines, game play objectives, missions and tasks, and capabilities associated with game play avatars. As a result, interactive game play has become more challenging even for experienced game players. If a game becomes too challenging, however, game players may forsake future game play out of frustration.

To help game players overcome obstacles or achieve goals in a variety of interactive games, various content providers have begun publishing game magazines. These magazines provide game players with a 'walk thru' that tell the reader/game player where to go and what to do in order to 'win' the game or obtain the highest possible score. Hints or suggestions with respect to special moves or avatar capabilities may also be described in these gaming magazines.

While these magazines may be informative, they suffer from a number of drawbacks. If the magazine is not published by an official source (e.g., an official partner of the game developer), the magazine may omit essential information. In some instances, an unofficial magazine may publish incorrect information. Incorrect information may also result from the tendency to rush and publish these magazines concurrently with the release of an interactive game title to allow for concurrent purchase—even if the magazine is published by an official source.

Game players may also discover 'Easter Eggs' or other secrets during the course of game play. These secrets may not be a part of even an official magazine due to the fact that some game design engineers 'slip in' these Easter Eggs without the knowledge of the magazine publisher. Many interactive games also allow for the creation of special moves that may not have initially been conceived of by the game developer. As a result, these special moves are not a part of the game play magazine—official or otherwise—as their development occur after the magazine and associated game has gone to market.

Once game play magazines publish, subsequent editions tend not to be published. The lack of subsequent, updated editions may further the information that may be withheld from game players. Unique game play situations or circumstances may not become apparent until the interactive game is played by a large number of game players. These situations and circumstances may not be addressed in the gaming magazine thereby leaving game players at a loss as to how they may properly address the same.

In contrast, the Internet offers the opportunity for endless publishing and republishing of information. If a particular solution is not offered in a game magazine, that solution may subsequently be published on the Internet.

Notwithstanding endless publishing possibilities, websites on the Internet are often decentralized and unorganized. In some instances, there is no 'official website' as game developers may wish for game players to purchase a 'for fee' official magazine rather than access a free on-line website. Additionally, one website may offer one solution for one particular game play situation whereas another website may offer a solution for another situation. In order for a game player to obtain a complete 'walk thru' of a particular interactive game, the user may have to visit multiple websites on the Internet. Since these websites tend to be 'unofficial,' there is often an issue with the veracity or accuracy of the information displayed on these websites.

There is a need in the art for game play advice that is complete and up-to-date regardless of when a particular interactive gaming title is released. Further, there is a need for game play advice that is pervasive and easily accessible to game players. There is also a need for game play advice that is accurate and credible such that game players can trust or rely upon the rendered advice.

SUMMARY OF THE INVENTION

Embodiments of the present invention provide a system and methods for managing user-generated game play advice.

In one exemplary embodiment, a method for managing user-generated game play advice includes receiving new game play advice from a user. The new game play advice is displayed to a community of users. The new game play advice is initially displayed in a default ranking position. Display of the new game play advice occurs in conjunction with previously received game play advice. Feedback associated with the quality of the new game play advice and/or the previously received game play advice is received from the community of users. The new game play advice is ranked against the previously received game play advice based on the feedback received from the community of users. The new game play advice is then (re)displayed in conjunction with the previously received game play advice. The (re)display of the new game play advice and previously received game play device occurs in accordance with the ranking of the new game play advice and the previously received game play advice and without the default ranking initially allocated to the new game play advice.

In another exemplary embodiment, a system for managing user-generate game play advice is provided. The exemplary system includes a game play advice submission engine. The game play advice submission engine receives game play advice submissions over a network; the submissions are allocated a ranking by a ranking engine. A game play advice display engine displays game play advice submissions in accordance with a ranking allocated by the ranking engine. A feedback engine receives feedback from a community of users with respect to the quality of the game play advice displayed by the game play advice display engine. The feedback engine and the ranking engine operate to allocate a new ranking to the game play advice in accordance with the feedback received from the community of users. The game play advice is subsequently displayed by the game play advice display engine in accordance with the new ranking.

A further exemplary embodiment provides for a method for displaying user-generated game play advice. In the present exemplary method, new game play advice is received from a first user, that user having previously received feedback from a community of users. The new game play advice is ranked against previously received game play advice. The previously received game play advice has been submitted by at least a second user that has previously received feedback from the community of users. The new game play advice is ranked against the previously received game play advice based on the user feedback received from the community of users. The new game play advice is displayed in conjunction with the previously received game play advice. The new game play advice and the previously received game play advice are displayed in accordance with the ranking of the new game play advice and the previously received game play advice.

A still further embodiment provides for a method for managing user-generated game play advice where new game play advice is received from a user. The new game play advice is displayed to a community of users. The new game play advice is initially displayed in a default ranking position. Display of the new game play advice occurs in conjunction with previously received game play advice. The user submitting the advice receives feedback from a community of users as does another user, that user having previously received feedback from the community of users. Feedback associated with the quality of the new game play advice and/or the previously received game play advice is also received from the community of users. A weighting value is assigned to the user feedback and the feedback associated with the quality of the game play advice. The new game play advice is ranked against the previously received game play advice based on the user feedback received from the community of users in addition to feedback associated with the quality of the game play advice. The ranking occurs in accordance with the weighting values assigned to the user feedback and feedback associated with the quality of the game play advice. The new game play advice is displayed in conjunction with the previously received game play advice and in accordance with the ranking of the new game play advice and the previously received game play advice.

DETAILED DESCRIPTION

The elements identified throughout are exemplary and may include various alternatives, equivalents, or derivations thereof. Various combinations of hardware, software, and computer-executable instructions may be utilized. Program modules and engines may include routines, programs, objects, components, and data structures that effectuate the performance of particular tasks when executed by a processor, which may be general purpose or application specific. Computer-executable instructions and associated data structures stored in a computer-readable storage medium represent examples of programming means for executing the steps of the methods and/or implementing particular system configurations disclosed herein.

Figure 1:
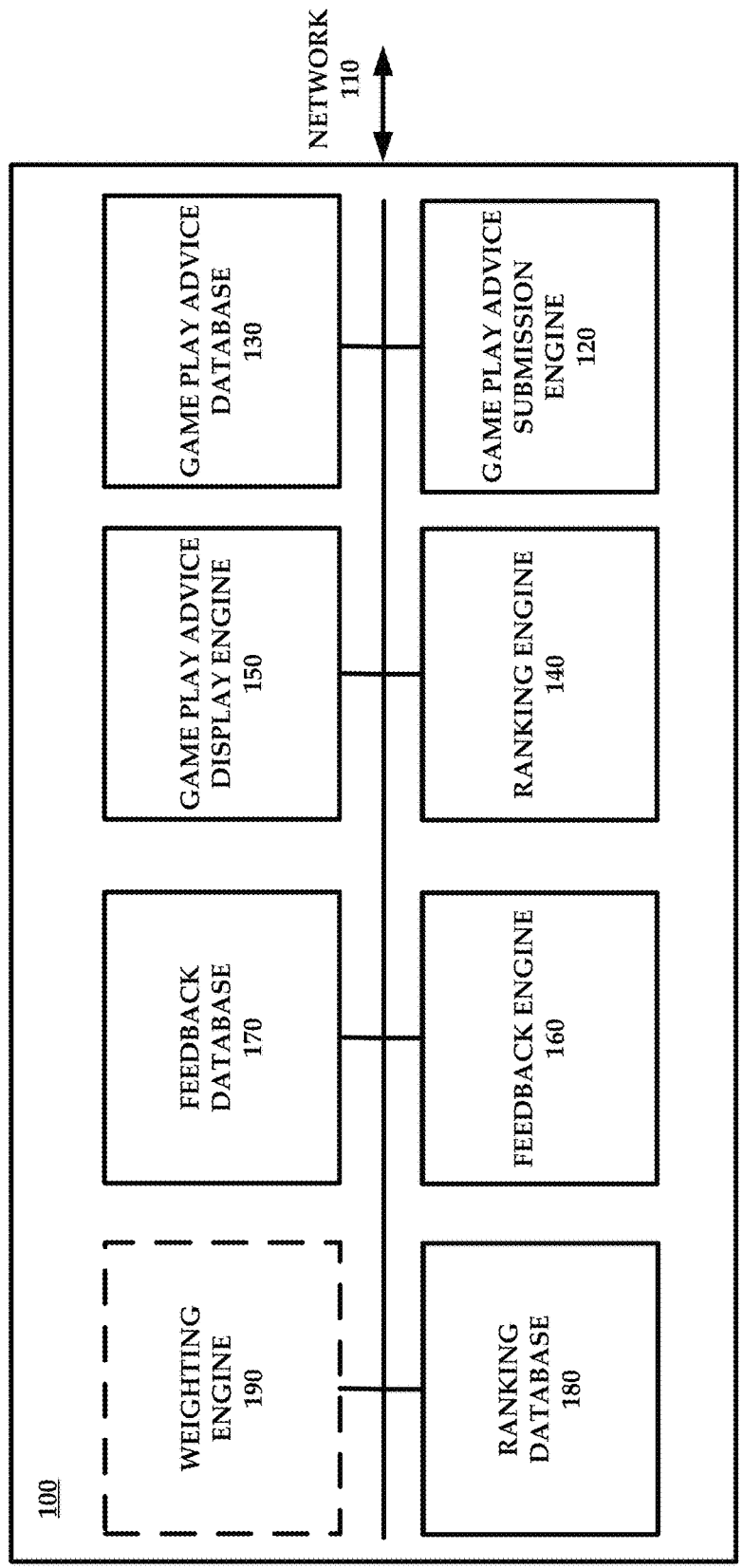
FIG. 1 illustrates an exemplary system for ranking and managing user-generated game play advice.

FIG. 1 illustrates an exemplary system 100 for ranking and managing user-generated game play advice. The system 100 of FIG. 1 includes a game play advice submission engine 120, game play advice database 130, ranking engine 140, game play advice display engine 150, feedback engine 160, feedback database 170, and ranking database 180. In some embodiments (like that illustrated in FIG. 1), the system 100 may also include an optional weighting engine 190. While various engines and databases are described in the context of FIG. 1, an embodiment of the present invention may offer the functionality of each or certain of these engines and databases in a single 'game play advice management' engine or database.

System 100 may be implemented in a network environment 110 such as the Internet, a proprietary communications environment, or a combination of the two. In one example, system 100 is an integrated component of the Playstation® Network. System 100 (or components thereof) may communicate with the network environment 110 utilizing any number of network interfaces as are known in the art. Examples of such interfaces include a 1000BASE-T Ethernet port or an IEEE 802.11 b/g network WiFi interface.

System 100 may be implemented in a computing device such as a server dedicated to managing user-generated game play advice including maintenance of various databases. Alternatively, system 100 may be implemented in a computing device hosting a number of applications such as community maintenance, admission, and network game data distribution. System 100 may be dedicated to a single network game, a genre of games, or any number of games having no particular affiliation at all.

System 100 may also be implemented in a distributed peer-to-peer environment. In such an implementation, certain applications and/or responsibilities may be managed by a group of computing devices in the environment. A first computing may be represented by a game platform such as the PlayStation®3. This particular computing device may be responsible for ranking operations that take place via a ranking engine and maintaining a database of related information. A second computing device such as a desktop or laptop computer may be responsible for feedback operations that take place via a feedback engine and maintaining a database of related information.

Various engines may be distributed to a community of users (e.g., players of a particular game or users in a general gaming network) through a push operation from a tasked server in the game community. Alternatively, various engines may be embodied in a computer-readable storage medium that also includes a particular game application (e.g., a disc). Distributed applications and engines may communicate directly via a group of peers or may be administered by a management server.

Game play advice submission engine 120 is configured to allow a user to communicate with the system 100 over network 110 for submission of game play advice. Game play advice submission engine 120 may generate a user-interface for allowing user interaction with the system 100. The interface may be a simple text-entry screen where users identify a game title, user identity (i.e., who is submitting the advice) in the form of a 'real name' or 'screen name,' and particular game play advice.

Game play advice submission engine 120 may generate a 'drop down' menu to allow for easy entry of information. Drop-down menus may identify a variety of game titles (in order to maintain consistency of game title naming). Drop down menus may also allow for identification of particular types of advice such as special moves, Easter Eggs, unlocking weapons, or defeating particular enemies. Drop down menus may also identify particular portions of an interactive gaming environment by level or environmental description (e.g., Level 1 or 'The Volcano'). Similar identification may occur with respect to particular objects, weapons, or enemies.

Menus generated by the game play advice submission engine 120 may be level-based. A level-based menu configuration may cause the selection of one item at a first level of a menu to branch out into a series of options concerning a second level of related menu items. Selection of an entry at the second level may spawn a third-level and so on. Spawning of various levels may continue until there is no further information to be entered.

Entry of the game play advice may be textual where a user enters a written description of the game play advice (e.g., 'at the castle gate, look behind the statute for a hidden treasure'). Text-entry may occur through a virtual keyboard manipulated by a game controller coupled to a gaming platform. The gaming platform, in turn, is coupled to the system 100 via network 110. Submission of game play advice may be audible and provided by speaking into a USB microphone headset. In some embodiments, video clips or still-frame images of game play may be submitted in the context of or as game play advice. Combinations of game play advice submissions are also within the scope of the present invention (e.g., a video clip with audible narration).

Game play advice database 130 is configured to manage user-generated game play advice submitted through an interface generated by the game play advice submission engine 120. Game play advice database 130 may manage submitted game play advice by user, game title, nature of the advice, date, size, content of the advice (e.g., video, audio, text, combinations of content), and so forth. Game play advice database 130 may include non-user generated game play advice (e.g., pre-stocked game play advice from the game publisher) that may also be ranked and displayed by system 100.

Game play advice database 130 may be configured to store all game play advice received through an interface generated by game play advice submission engine 120. Alternatively, certain game play advice may expire over time or upon the occurrence of certain events. For example, the game play advice database 130 may only retain the top-100 ranked game play advice submissions. Once a particular instance of game play advice falls below a top-100 threshold, that particular instance may be deleted from the game play advice database 130. Expiration may be temporal such that instances of game play advice that are not accessed for a particular period of time are removed from the game play advice database 130. Instances of game play advice may also be removed from the game play advice database 130 a predetermined number of days after having been submitted to the system 100.

Ranking engine 140 is configured to manage the ranking of game play advice stored in game play advice database 130. When new game play advice is received, the ranking engine 140 of FIG. 1 will assign a default ranking to that new instance of game play advice. This default ranking and any other ranking (including those generated as a result of user feedback) may be measured utilizing any rubric capable of distinguishing one instance of user-generated game play advice from another. Rankings may be numeric (e.g., 1, 2, 3 . . . 101, 102, etc.) or characteristic (e.g., poor, good, very good, excellent, etc.). Simplistic rankings may also be used such as a binary indication of 'good'/'bad' or 'thumbs up'/'thumbs down.' A percentage value may also be used by ranking engine 140. For example, an '86% ranking' may reflect that 86 percent of all user feedback received with respect to a particular instance of game play designated the advice as 'good or better.'

Tie-breakers may be utilized by the ranking engine 140 with respect to multiple instances of game play advice that are allocated rankings of equal value. Equally-ranked game play advice may be distinguished by an alphabetical ordering of the screen name or real name of the user submitting the game play advice. Equally-ranked game play advice may also be displayed based on the time the game play advice was submitted. Previously received and equally ranked game play advice may be moved to the bottom of a ranking ladder versus more recently received (and equally ranked) game play advice. Equally-ranked game play advice may also be displayed in a random order albeit in the context of other equally-ranked advice.

Ranking engine 140 may operate in conjunction with ranking database 180 to maintain a record of a current or prior ranking of any particular instance of game play advice. Ranking engine 140 may also work in conjunction feedback engine 160, feedback database 170, and, in some embodiments, optional weighting engine 190 to more accurately identify the perceived quality of game play advice as adjudicated by a community of users.

Game play advice display engine 150 is configured to display user-generated game play advice in accordance with a ranking result generated by ranking engine 140. Game play advice display engine 150 acquires information from the game play advice database 130 (the advice) and the ranking database 180 (the ranking of the game play advice as determined by ranking engine 140) and displays the game play advice in accordance with an allocated ranking. The game play advice display engine 150 may utilize an asynchronous programming language to provide real-time (or substantially near real-time) updates to ranked game play advice for display to a community of users.

Figure 5A:
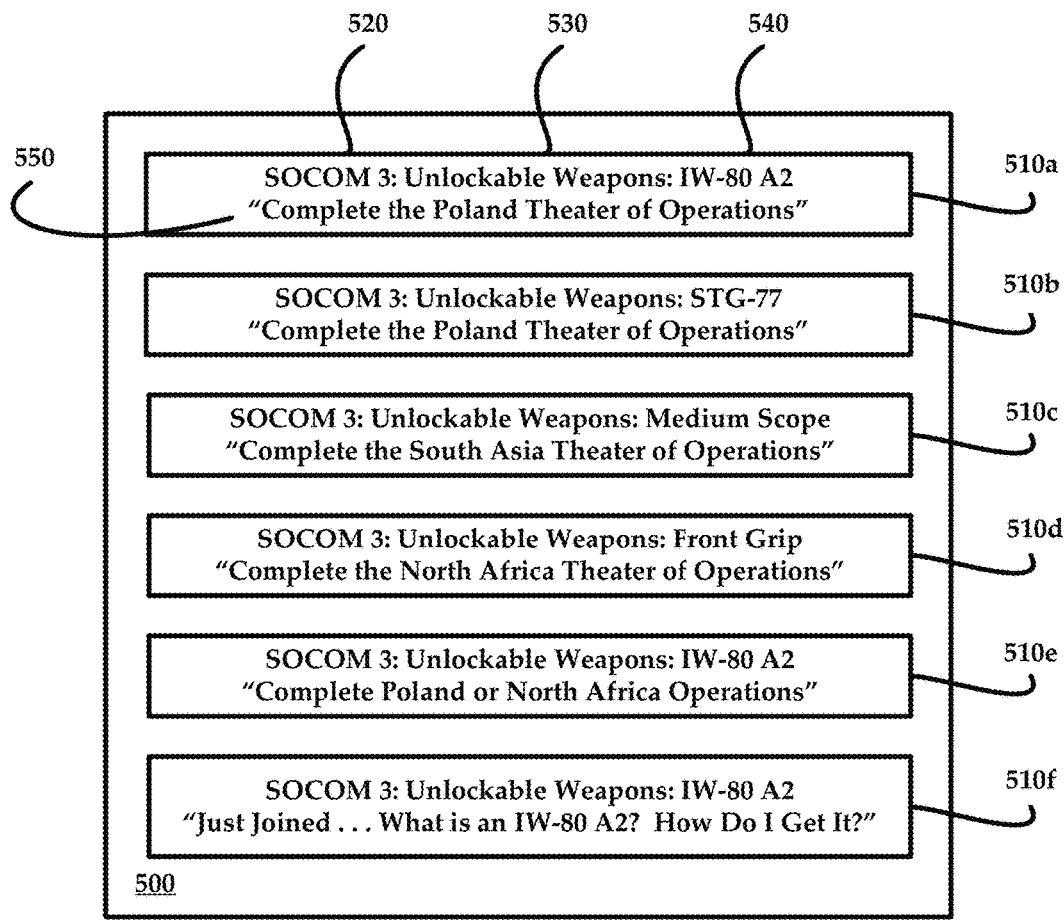
FIG. 5A illustrates an exemplary ladder ranking of user-generated game play advice.

Game play advice display engine 150 may utilize a ladder ranking of game play advice. In such an embodiment, the highest quality advice is presented at the top of a ladder and the worst advice is relegated to the bottom of the ladder. The quality of the advice decreases as a user moves from the top of the ladder to the bottom. In some embodiments, the particular arrangement of the advice may be subject to user or system preferences (e.g., the advice may be listed in an inverse order where the best advice is listed at the bottom of the ladder and the worst advice at the top). FIG. 5A illustrates an exemplary ladder ranking 500 of user-generated game play advice (510*a* . . . *f*).

In FIG. 5A, the ladder ranking 500 includes six exemplary instances of user-generated game play advice (510*a* . . . *f*). Each instance of game play advice identifies a title of the interactive game for which the advice is rendered 520 (i.e., SOCOM 3); the nature of the advice 530 (i.e., pertaining to 'unlockable' weapons); and the particular unlockable weapon at issue 540 (e.g., an IW-80 A2, an STG-77, a medium scope, and a front grip). Each instance also includes the advice itself 550 (e.g., "Complete the Poland Theater of Operations" in the case of instance 510*a*).

The information displayed in each instance of game play advice (e.g., game title, nature of the advice, etc.) and the format of the same (e.g., text entries versus graphical illustrations) may vary depending on a particular embodiment of system 100 and game play advice display engine 150. Additional information may also be displayed in each instance of game play advice. For example, an embodiment of ladder ranking 500 may include the screen name of the user submitting particular information, the date the advice was submitted, a visible indication of the ranking of the instance of game play information (e.g., 1 of 6; 86% approval; thumbs up), or the number of times feedback has been rendered with respect to that particular instance of game play advice. An indication that a particular ranking is the result of a default ranking may also be displayed.

In FIG. 5A, the best quality game play advice is displayed at (or near) the top of the ladder ranking 500. With respect to this particular game title, the IW-80 A2 may represent a particularly desirable weapon. Information regarding acquisition of this weapon may, therefore, be highly valued (i.e., to obtain this weapon "Complete the Poland Theater of Operations" as reflected by advice 550 of instance 510*a*).

In another instance of game play advice (510*f*), the weapon is the same as that discussed in the most highly ranked instance (510*a*) (i.e., the aforementioned IW-80 A2) but the advice is of such poor quality that the advice is located at the lower-most rung of the ladder ranking 500. With respect to game play advice instance 510*f*, the user submitting the 'advice' has just begun playing this particular game title and does not know what an IW-80 A2 is or how to acquire the same. As such, this unhelpful instance of game play advice is appropriately ranked and subsequently displayed at the bottom of the ladder ranking 500. As a result of this ranking, a user searching for information concerning the acquisition of an IW-80 A2 saves time by avoiding review of unhelpful information. Further, the user searching for advice on acquiring the IW-80 A2 is more likely to receive complete and accurate advice.

Game play advice display engine 150 may display advice in the context of a real-world virtual environment and/or a first- or third-person avatar. In such an embodiment, an avatar may move about a virtual environment like that offered by Sony Computer Entertainment Inc.'s "Home." "Home" is a three-dimensional online user community service that may be accessed utilizing the PlayStation®3 entertainment system.

Figure 5B:
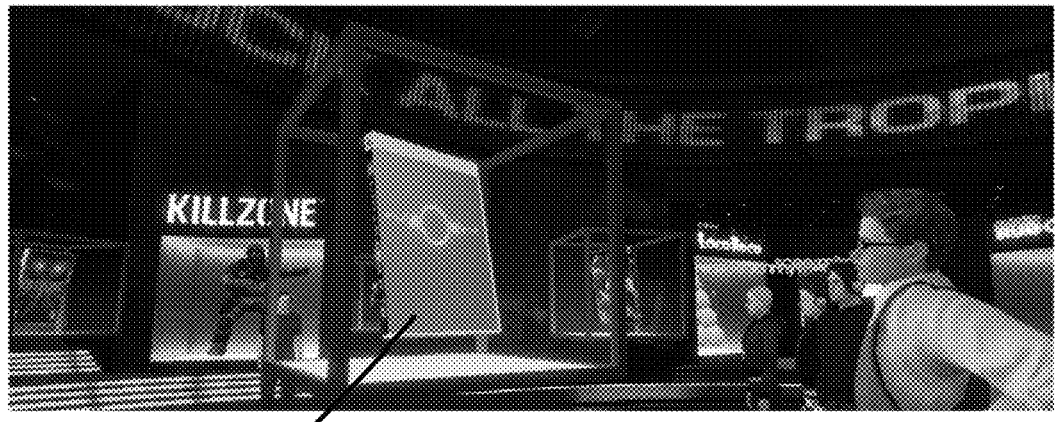
FIG. 5B illustrates an exemplary three-dimensional virtual environment that may be used in conjunction with the display of user-generated game play advice.
Figure 5C:
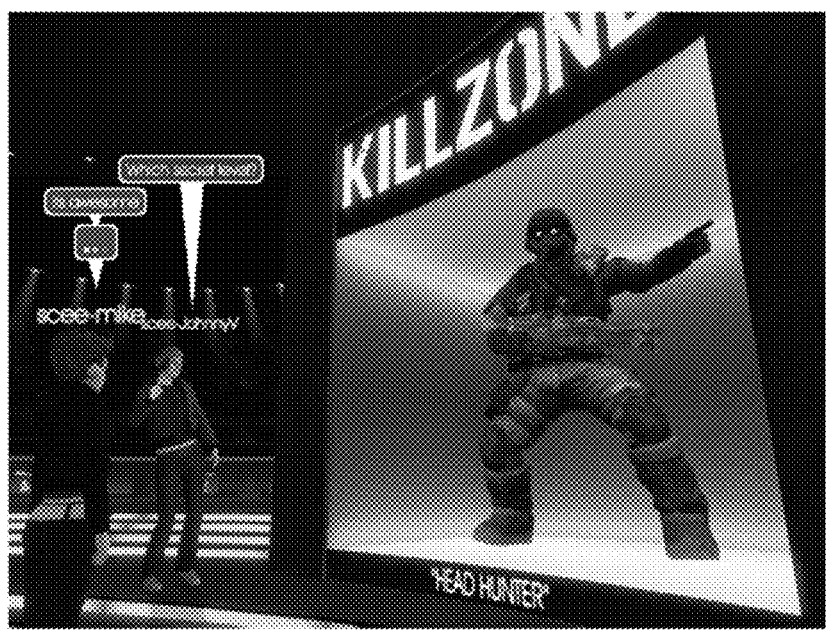
FIG. 5C illustrates another view of an exemplary three-dimensional virtual environment that may be used in conjunction with the display of user-generated game play advice like that shown in FIG. 5B.

The "Home" virtual environment offers a "Hall of Fame," two examples of which are illustrated in FIG. 5B and FIG. 5C, and that could be used in conjunction with the display of user-generated game play advice. For example, display area 560 could be used to display a ladder ranking 500 like that discussed in the context of FIG. 5A. Virtual objects associated with a reward or particular achievement may also be displayed such as a trophy. Game play advice may be displayed in the context of particular game titles or users.

In a virtual environment like that shown in FIG. 5B and FIG. 5C, game play advice display engine 150 may be integrated with the host of the virtual environment. Game play advice display engine 150 may also access the virtual environment through an application programming interface (API) native to the environment.

Other means of display of game play advice beyond the aforementioned ladder and virtual environment are within the scope of the present invention. Game play advice may be listed as a series of entries in a 'chat' string. Game play advice may be displayed and detailed commentary (in addition to ranking feedback) concerning the quality of that advice may be provided by the community of users. Game play advice may also be provided through a series of hyperlinks. Graphic images may also be utilized, especially in the context of game play advice that incorporates full motion video or still images. Links to audio files may be appropriate in the case of audio-rendered advice. All of the aforementioned means of providing game play advice to a community of users (and in accordance with an assigned default or feedback controlled ranking) may be managed by the game play advice display engine 150.

Feedback engine 160 is configured to accept feedback from other game players following their viewing and subsequent use of game play advice provided via the game play advice display engine 150. Feedback engine 160 may be integrated or work in conjunction with game play advice display engine 150 with respect to receiving feedback. For example, feedback engine 160 may generate a prompt for receiving user-generated feedback. The prompt may be displayed in the immediate context of particular instances of game play advice, which are displayed by game play advice display engine 150.

User feedback may be any subjective assessment capable of distinguishing one instance of user-generated game play advice from another. User feedback may be numeric (e.g., 1 to 10, with 10 being high quality and 1 being low) or characteristic (e.g., good, very good, excellent, etc.). Simplistic binary indications of 'good' or 'bad' or a 'thumbs up' or 'thumbs down' may also be used. Feedback may include a textual (or spoken) assessment of the user-generated game play advice. Feedback may be entered manually (e.g., entry of a '10' through a virtual keyboard), selected from drop down menus, or submitted via graphic representations such as on-screen icons (e.g., selecting a 'thumbs up').

Feedback engine 160 may also be configured to request and accept a grade for a particular user from a community of users, the user having submitting game play advice to the system 100. The user grade may be a subjective assessment of a particular user registered with system 100. Other users in a community may grade a particular user based on their knowledge of the graded user's in-game exploits in a manner similar to providing feedback with respect to game play advice.

User grades may also be assessed automatically by the ranking engine 140 or an independent user grade engine (not shown). A grade for a particular user may be allocated with respect to the time that a user has been registered with the system 100 or played a particular game title (thus suggesting experience). Grades may also be assessed based on the number of tasks that a user has completed in a particular game or the number of levels that the user has 'conquered.' User grades may be particular to game, geographic region, or the entirety of the gaming network. The game community may also be defined by various tiers of experience (e.g., beginners, intermediate users, and experts). User grades may also be allocated within the delineation of a particular tier to which a graded user belongs.

Feedback database 170 is configured to manage user feedback to game play advice submitted through feedback engine 160. Feedback database 170 may be configured to store all community generated feedback as it pertains to game play advice. Certain feedback may expire over time (e.g., a predetermined number of days after having been submitted to the system 100). Feedback database 170 may track the nature of the feedback (e.g., a subjective assessment) with respect to a particular instance of game play advice. Feedback database 170 may further track the identity of the user submitting user feedback via the feedback engine 160.

Ranking database 180 is configured to manage ranking of user-generated game play advice as ranked by the ranking engine 140. Ranking database 180 may also store user grade information generated by the ranking engine 140. Ranking database 180 may be updated in real-time (or substantially in real-time) in order to provide game play advice display engine 150 with the most up-to-date and available ranking information as it pertains to particular instances of game play advice. Ranking information stored in the ranking database 180 may expire after a set period of time. Lower ranked game play advice (e.g., advice falling below a certain minimum ranking) may be removed from the ranking database 180 while higher ranked information is maintained in the ranking database 180.

Optional weighting engine 190 may be used for ranking user-generated game play advice based on the quality of the advice and the reputation or experience of the user submitting the advice. Optional weighting engine 190 is configured to introduce a weighting algorithm that allocates a particular value to the grade of a user submitting game play advice and another value to the actual game play advice. For example, if the user is regarded by the game community (i.e., the user has a higher user grade) but the game play advice submitted by the player is of low quality (as reflected by user feedback), the optional weighting engine 190 may apply a first weighting value to the user grade (e.g., 75%) and a second weighting value to the game play advice (e.g., 25%) to formulate (in conjunction with the ranking engine 140) a ranking of the game play advice. The game play advice is then displayed through the game play advice display engine 150 whereby the first and second weighting values allocated by the optional weighting engine 190 proportionally affect the ranking of the game play advice. The actual weighting valuations applied to the user grade and the game play advice may be set and adjusted by an administrator of the system 100.

Figure 2:
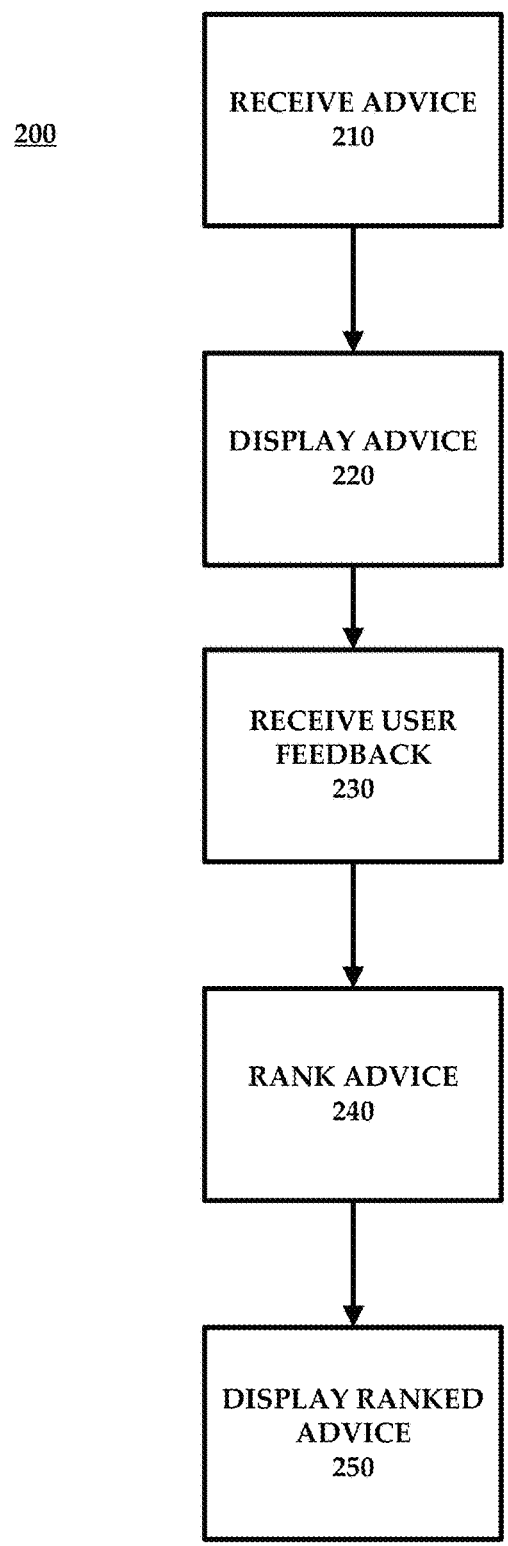
FIG. 2 illustrates an exemplary method for ranking user-generated game play advice based on the quality of the advice.

FIG. 2 illustrates an exemplary method 200 for ranking user-generated game play advice based on the quality of the advice. The steps identified in FIG. 2 (and the order thereof) are exemplary and may include various alternatives, equivalents, or derivations thereof including but not limited to the order of execution of the same. The steps of the process of FIG. 2 (and its various alternatives) may be embodied in hardware or software including a computer-readable storage medium (e.g., optical disc, memory card, or hard drive) including instructions executable by the processor of a computing device.

In step 210, user-generated game play advice is received from a user in the community via an interface generated by the game play advice submission engine 120. Upon receipt of the user-generated game play advice in step 210, the advice is processed by the system 100 as described in the context of FIG. 1 and assigned a default ranking by ranking engine 140. The game play advice may be stored in game play advice database 130. The default ranking may be stored in ranking database 180.

The processed and default ranked game play advice is subsequently displayed via the game play advice display engine 150 in step 220. Upon display in step 220, the user-generated game play advice is available for viewing by other members of the gaming community. The members of the community may then act upon that advice during the course of game play.

The newly received and default ranked game play advice is also displayed in conjunction with previously received game play advice, which is also stored in game play advice database 130. The previously received game play advice may have been previously displayed and ranked or may be displayed for the first time with a default ranking (i.e., multiple instances of game play advice are being displayed for the first time). The newly received game play advice may also be displayed with pre-packaged game play advice from the game publisher.

A user acting upon any displayed game play advice may return to the system 100 and provide feedback as to the quality of that particular game play advice in step 230. The feedback may be provided via a prompt generated by feedback engine 160. The nature of the feedback may be like that described in the context of FIG. 1 with respect to feedback engine 160 (e.g., a number of 'stars' or 'thumbs up' or 'thumbs down'). Advice that resulted in better game play may receive a higher ranking than advice that resulted in lesser game play. The presentation of the game play advice may also affect the ranking. For example, if the advice was presented in such a way as to make the advice confusing notwithstanding the validity of the advice, the particular instance may receive a lesser ranking.

After having received feedback in step 230, the ranking engine 140 of system 100 will rank the new game play advice against previously received (and possibly ranked) game play advice in step 240. Ranking of the new game play advice with respect to the previously received (and perhaps ranked) game play advice will take into account the feedback received by the feedback engine 160 and stored in feedback database 170. After having received an initial indication of quality based on user feedback, game play advice will lose its 'default' ranking and move up or down a ladder of all available game play advice based on its valuation against other game play advice.

Following the ranking operation of step 240, the results of which may be stored in ranking database 180, the new game play advice and previously received game play advice will be (re)displayed by the game play advice display engine 150 in step 250. The (re)display of the game play advice will reflect any received user feedback from step 230 and the subsequent ranking operation of step 240. Based on the ranking operation of step 240, quality game play advice will rise to the top of a list of game play advice or be communicated to the community of users such that they know the advice that has received high approval from the community versus game play advice perceived to have little or no value.

The method 200 of FIG. 2 may operate in real-time (or substantially in real-time) using an asynchronous programming language such as Ajax. In an asynchronous language like Ajax, small amounts of data are continually exchanged with a database so that an entire user interface need not be reloaded in response to each user interaction. In such an embodiment, an XMLHttpRequest object may be utilized to fetch the most recent game play advice rankings from the ranking database 180 of FIG. 1. This ranking information, and the corresponding game play advice retrieved from game play advice database 130, may then be displayed via an interface generated by the game play advice display engine 150. Relationships between rankings, user feedback, and game play advice may be reflected by metadata or header data stored in the various databases of system 100. Game play advice rankings may thus be updated as feedback is received and new rankings are calculated.

The method 200 of FIG. 2 may also operate subject to a predetermined schedule. For example, the ranking engine 140 may update the ranking database 180 at five minute intervals (or any other time period as may be determined by a system administrator). Once the ranking database 180 is updated as a result of a regularly scheduled ranking operation, the newly updated ranking information may be pushed to the game play advice display engine 150 for display to the community of users in conjunction with the game play advice retrieved from game play advice database 130. The updated ranking information in the ranking database 180 may also be available for access in response to a user request or query. A user request for ranking information may instantiate the ranking operation and the subsequent display of ranked game play advice.

Figure 3:
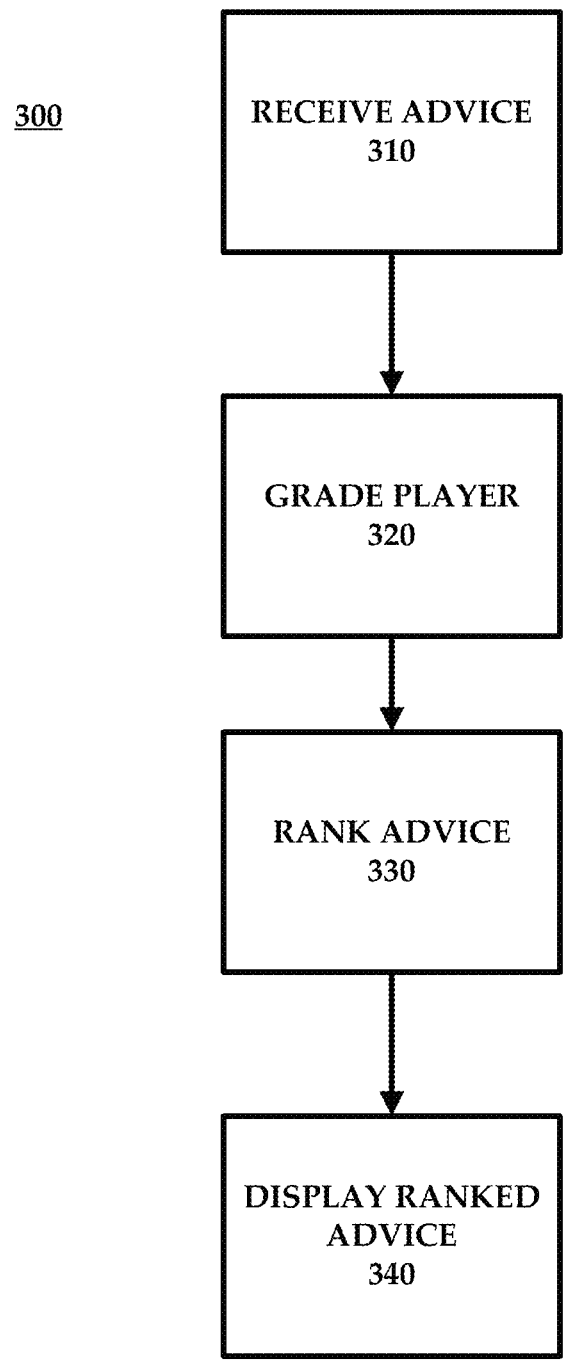
FIG. 3 illustrates an exemplary method for ranking user-generated game play advice based on the reputation of the user submitting the advice.

FIG. 3 illustrates an exemplary method 300 for ranking user-generated game play advice based on the reputation of the user submitting the advice. The steps identified in FIG. 3 (and the order thereof) are exemplary and may include various alternatives, equivalents, or derivations thereof including but not limited to the order of execution of the same. The steps of the process of FIG. 3 (and its various alternatives) may be embodied in hardware or software including a computer-readable storage medium (e.g., optical disc, memory card, or hard drive) including instructions executable by the processor of a computing device.

In step 310, user-generated game play advice is received at the system 100 from a user in a game community. Receipt of game play advice may occur through a user interface generated by the game play advice submission engine 120. The submitting user may be identified as part of the submission process. Identification may occur through manual entry of a screen name. Identification may also occur via a user profile accessed when the user logged into the gaming community.

Automated grading of the submitting user by the ranking engine 140 takes place in step 320 such that a determination as to the authority of the provided game play advice may be made. For example, if a user is playing a particular game for the first time, any advice proffered by that player is likely of little value due to that player's general inexperience with the game. If a user is experienced with respect to that game, however, then any advice provided by that user may be of greater value due to their vast experience with game play. Experience may be derived from game play statistics or other data, which may be associated with a user profile.

Alternatively, the submitting user may be graded based on their actual performance in a particular game. A particular user may play a game numerous times but lack any exceptional ability with respect to that particular game. In these instances, grading the user based on the number of times that they have played the game may be misleading. Grading the user based on performance in the game may be more indicative of the quality of the advice the user might offer.

User performance may be based on any variety of factors. For example, a user may be graded based on a score achieved, a level reached, or a length of the user existed in a particular game environment without being 'killed.' Performance may also be based on objectives completed, items obtained, weapons mastered, enemies killed, and so forth.

Once the user is graded in step 320, the ranking engine 140 will rank new game play advice against previously received (and perhaps ranked) game play advice in step 330. After having received an initial indication of quality based on grading of the user, game play advice will be ranked and that ranking information will be stored in ranking database 180 while the game play advice is stored in game play advice database 130.

Following the ranking operation of step 330, the new game play advice and previously received game play advice will be displayed in step 340 by the game play advice display engine 150. The display of the game play advice will reflect the grading of the user with respect to the game play advice as occurred in steps 320 and the subsequent ranking operation of step 330. Based on the ranking operation of step 330, quality game play advice will rise to the top of a list of game play advice or be communicated to the community of users such that they know the advice was offered by a game player of exceptional ability versus having come from a user with little to no experience or ability.

The method 300 of FIG. 3 may operate in real-time or substantially in real-time. Like the method of FIG. 2 (200), such real-time functionality may be effectuated using an asynchronous programming language whereby the most recent game play advice rankings vis-à-vis a user grade are retrieved from the ranking database 180 and displayed via the game play advice display engine 150. In this matter, game play advice rankings are updated as user grading is calculated.

Like the method of FIG. 2 (200), the method of FIG. 3 (300) may also operate subject to a predetermined schedule whereby the ranking engine 140 updates the ranking database 180 at regular intervals. Once the ranking database 180 is updated as a result of a regularly scheduled ranking operation, the newly updated ranking information may be pushed to the game play advice display engine 150 for display to the community of users in conjunction with the game play advice retrieved from game play advice database 130. Alternatively, the updated information in the ranking database 180 may available for access in response to a user request or query. A user request for ranking information may instantiate the ranking operation and the subsequent display of ranked game play advice.

User grading may also be in response to feedback received from the gaming community. In such an embodiment, user grading step 320 will involve feedback engine 160 calculating a community valuation of a particular user based on information retrieved from the feedback database 170 and prior ranking information retrieved from the ranking database 180. Steps 330 and 340 of the method 300 of FIG. 3 will proceed as described above with the exception that the ranking of game play advice is now based on user feedback rather than an automated determination made solely by ranking engine 140.

In a still further embodiment, the user grade may involve a weighting algorithm imposed by optional weighting engine 190. In such an embodiment, community feedback may be assigned a first weighting value by the weighting algorithm of optional weighting engine 190. The automated ranking generated by the ranking engine 140 may be allocated a second weighting value. These weighted values may proportionally affect a final ranking (also calculated by the ranking engine 140) that is ultimately stored in the ranking database 180 for retrieval by the game play advice display engine 150.

Figure 4:
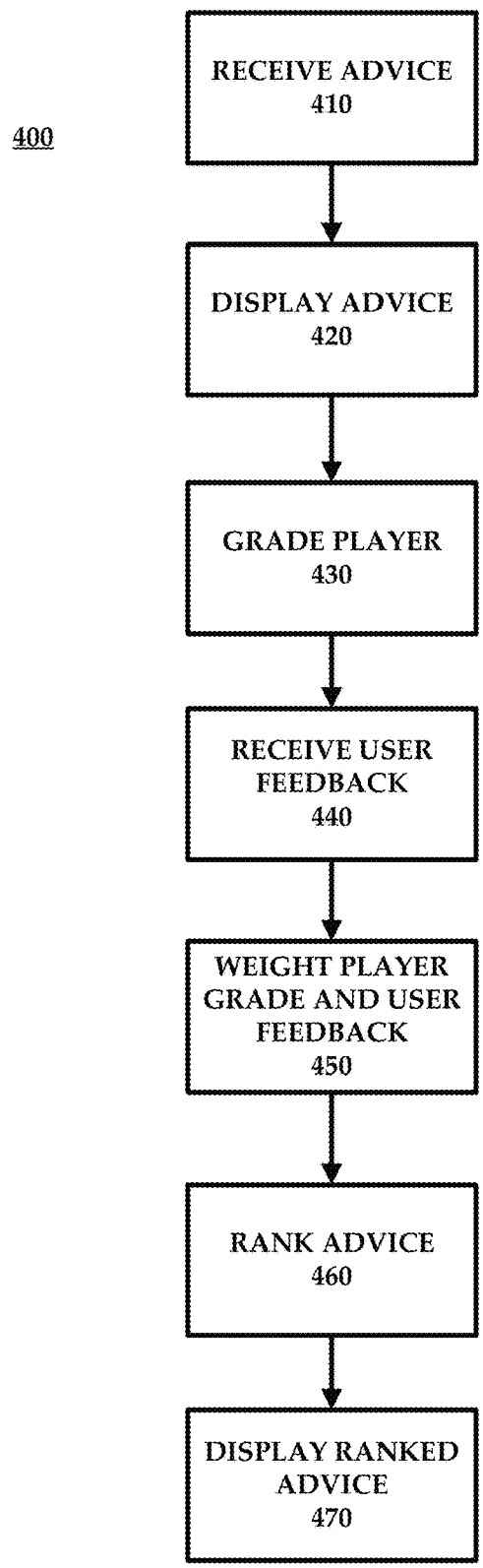
FIG. 4 illustrates an exemplary method for ranking user-generated game play advice based on the quality of the advice and the reputation of the user submitting the advice.

FIG. 4 illustrates an exemplary method 400 for ranking user-generated game play advice based on the quality of the advice and the reputation of the user submitting the advice. The steps identified in FIG. 4 (and the order thereof) are exemplary and may include various alternatives, equivalents, or derivations thereof including but not limited to the order of execution of the same. The steps of the process of FIG. 4 (and its various alternatives) may be embodied in hardware or software including a computer-readable storage medium (e.g., optical disc, memory card, or hard drive) including instructions executable by the processor of a computing device.

In step 410, user-generated game play advice is received at the system 100 from a user in a game community. Upon receipt of the user-generated game play advice in step 410, the advice is processed by the system 100 and assigned a default ranking. Game play advice may be initially received through an interface generated by the game play advice submission engine 120 and stored in the game play advice database 130. Allocation of a default ranking may be allocated by ranking engine 140.

The processed and default ranked game play advice is subsequently displayed by the game play advice display engine 150 in step 420. The game play advice display engine 150 retrieves the default ranking information from ranking database 180 and the game play advice from the game play advice database 130. Upon display in step 420, the user-generated game play advice is available for viewing by other members of the gaming community who may then act upon that advice during the course of game play.

The newly received and default ranked game play advice may also be displayed in conjunction with previously received game play advice. The previously received game play advice may have been previously displayed (and ranked) or may be displayed for the first time with a default ranking. Display may take place concurrent with pre-packaged game play advice from the game developer, which may also be ranked.

In step 430, the submitting user is graded. Grading of the submitting user takes place such that a determination as to the authority of the game play advice provided may be made as was the case in FIG. 3. As was the case in FIG. 3, a user may be graded based on experience playing a particular game or performance with respect to a particular game. Grading may also be based on community feedback.

In step 440, feedback as to the quality of particular game play advice may be provided by users in the community via feedback engine 160. Advice that results in better game play may receive better feedback than advice that resulted in lesser game play or that was perhaps presented in such as way as to make the advice confusing and otherwise ineffective. Feedback may be stored in feedback database 170.

In step 450, the grading of the user as occurred in step 430 and the feedback provided with respect to particular game play advice as occurred in step 440 may be weighted. Weighting of the user grade and advice feedback may occur through optional weighting engine 190. As noted in the context of FIG. 1, the ratio of importance of the user grade versus the user feedback may be allocated as to best overall evaluate the advice provided by the user.

Following weighting of the user grade and the user feedback in step 450, the ranking engine 140 will rank the new game play advice against previously received game play advice in step 460. After having received an initial indication of quality based on user feedback and the user grade, game play advice will lose its 'default' ranking and move up or down a ladder of all available game play advice based on its valuation against other advice as a whole.

Following the ranking operation of step 460, the new game play advice and previously received game play advice will be (re)displayed in step 470 by game play advice display engine 150. The (re)display of the game play advice will reflect the results of the ranking operation of step 460, which may be retrieved from ranking database 180 in conjunction with the actual game play advice from game play advice database 130. Based on the ranking operation of step 460, quality game play advice from knowledgeable game players will rise to the top of a list of game play advice or be communicated to the community of users such that they know the advice that has received a combination of high approval from the community and was offered by an otherwise experienced or well qualified game player.

While the present invention has been described with reference to exemplary embodiments, it will be understood by those skilled in the art that various changes may be made and equivalents may be substituted for elements thereof without departing from the true spirit and scope of the present invention. For example, the aforementioned system 100 and methods discussed therein (e.g., FIG. 2-4) may be utilized to receive submissions, rank, display, accept feedback, and (re)rank and (re)display various forms of information other than game play advice. For example, the present system and methods may be employed in the context of search engine results or queries for on-line audio and video content. The aforementioned system and methods may also be used with respect to (reverse) auctions and bidding based on valuation/feedback of a seller, vendor, and/or product.

In addition, modifications may be made without departing from the essential teachings of the present invention. Various alternative systems may be utilized to implement the various methodologies described herein and various methods may be used to achieve certain results from the aforementioned systems.

What is claimed is:

1. A method for managing user-generated game play advice, the method comprising:
   receiving new game play advice from a user; and
   executing instructions stored in memory, wherein execution of instructions by a processor:
   displays the new game play advice to a community of users, the new game play advice displayed in a default ranking position and in conjunction with previously received game play advice, the new game play advice displayed by a ranking engine;
   receives feedback associated with the quality of the new game play advice or the previously received game play advice, the feedback received from the community of users, the feedback received by a feedback engine;
   ranks the new game play advice against the previously received game play advice based on the feedback received from the community of users; and
   displays the new game play advice in conjunction with the previously received game play advice, the new game play advice and previously received game play advice displayed in accordance with the ranking of the new game play advice and the previously received game pay advice, wherein the new game play advice is no longer displayed in the default ranking position.

2. The method of claim 1, wherein the new game play advice is displayed in a three-dimensional virtual environment including an object associated with a reward or achievement.

3. The method of claim 1, wherein the new game play advice is selected from the group consisting of textual, visual, and audible game play advice.

4. The method of claim 1, wherein the feedback is selected from a group consisting of numeric, characteristic, and binary feedback, the feedback including user commentary.

5. The method of claim 1, wherein ranking and displaying the new game play advice in a position that is not the default ranking position occurs substantially in realtime.

6. The method of claim 1, wherein ranking and displaying the new game play advice in a position that is not the default ranking position occurs according to a predetermined schedule.

7. The method of claim 1, wherein ranking and displaying the new game play advice in a position that is not the default ranking position occurs in response to a user query.

8. A system for managing user-generated game play advice, the system comprising:
a game play advice submission engine coupled to a server and executable by a processor to receive game play advice submissions over a network;
a ranking engine stored on a server and executable by a processor to allocate a ranking to the game play advice submissions received over the network;
a game play advice display engine stored on a server and executable by a processor to display the game play advice submissions in accordance with the ranking allocated by the ranking engine; and
a feedback engine stored on a server and executable by a processor to receive feedback from a community of users with respect to the quality of the game play advice submissions displayed by the game play advice display engine, wherein the feedback engine and the ranking engine operate to allocate a new ranking to the game play advice submissions in accordance with the feedback received from the community of users, the game play advice submissions being subsequently displayed by the game play advice display engine in accordance with the new ranking.

9. The system of claim 8, wherein the ranking allocated by the ranking engine is selected from the group consisting of numeric, characteristic, binary, and percentage-based rankings.

10. The system of claim 8, wherein the ranking engine applies a tiebreaker to game play advice submissions receiving an equal ranking from the ranking engine.

11. The system of claim 8, wherein the game play advice display engine operates using an asynchronous programming language to continually update the displayed game play advice submissions in accordance with a most recent new ranking as allocated by the feedback engine and the ranking engine.

12. The system of claim 8, wherein the game play advice display engine displays game play advice submissions in accordance with a most recent new ranking as allocated by the feedback engine and the ranking engine according to a predetermined schedule.

13. The system of claim 8, wherein the game play advice display engine displays game play advice submissions in accordance with a most recent new ranking as allocated by the feedback engine and the ranking engine in response to a user query.

14. The system of claim 8, wherein the feedback engine further receives feedback from a community of users with respect to the reputation of a user submitting game play advice.

15. The system of claim 8, wherein the ranking engine further allocates a grade to a user in a community of users for a particular interactive game based on accomplishments or experience of the user with respect to the particular interactive game.

16. The system of claim 14, further comprising a weighting engine stored on a server and executable by a processor, the weighting engine allocating a first value to the feedback received from the community of users with respect to the quality of the game play advice and a second value to the reputation of the user submitting the game play advice, the first and second value proportionally affecting the new ranking allocated to the game play advice.

17. The system of claim 15, further comprising a weighting engine stored on a server and executable by a processor, the weighting engine allocating a first value to the feedback received from the community of users with respect to the quality of the game play advice submissions and a second value to the user grade received from the community of users, the first and second value proportionally affecting the new ranking allocated to the game play advice submissions.

18. A method for displaying user-generated game play advice, the method comprising:
receiving new game play advice from a first user, the first user having previously received feedback from a community of users; and
executing instructions stored in memory, wherein execution of instructions by a processor:
ranks the new game play advice against previously received game play advice, the previously received game play advice having been submitted by at least a second user, the at least a second user having previously received feedback from the community of users, wherein the ranking of the new game play advice against the previously received game play advice is based on the feedback received from the community of users; and
displays the new game play advice in conjunction with the previously received game play advice, the new game play advice and previously received game play advice displayed in accordance with the ranking of the new game play advice and the previously received game play advice.

19. The method of claim 18, wherein the new game play advice is displayed in a three-dimensional virtual environment including an object associated with a reward or achievement.

20. The method of claim 18, wherein the new game play advice is selected from a group consisting of textual, visual, and audible game play advice.

21. The method of claim 18, wherein the feedback is selected from the group consisting of numeric, characteristic, and binary feedback, the feedback including user commentary.

22. The method of claim 18, wherein ranking and displaying the new game play advice occurs substantially in realtime.

23. The method of claim 18, wherein ranking and displaying the new game play advice occurs according to a predetermined schedule.

24. The method of claim 18, wherein ranking and displaying the new game play advice occurs in response to a user query.

25. A method for managing user-generated game play advice, the method comprising:

receiving new game play advice from a user; and executing instructions stored in memory, wherein execution of instructions by a processor:

displays the new game play advice to a community of users, the new game play advice displayed in a default ranking position and in conjunction with previously received game play advice, the new game play advice displayed by a ranking engine;

ranks the new game play advice against the previously received game play advice, the previously received game play advice having been submitted by at least a second user, the at least a second user having previously received feedback from the community of users, wherein the ranking of the new game play advice against the previously received game play advice is based on the feedback received from the community of users;

receives feedback associated with the quality of the new game play advice or the previously received game play advice, the feedback received from the community of users, the feedback received by a feedback engine;

assigns a first weighting value to the user feedback and a second weighting value to the feedback associated with the quality of the game play advice;

ranks the new game play advice against the previously received game play advice based on the feedback received from the community of users and the feedback associated with the quality of the game play advice, wherein the ranking occurs in accordance with the first weighting value and the second weighting value; and displays the new game play advice in conjunction with the previously received game play advice, the new game play advice and previously received game play advice displayed in accordance with the ranking of the new game play advice and the previously received game play advice, wherein the new game play advice is no longer displayed in the default ranking position.

* * * * *